(12) United States Patent
Takayama et al.

(10) Patent No.: US 7,747,287 B2
(45) Date of Patent: Jun. 29, 2010

(54) MOBILE TELEPHONE

(75) Inventors: Masayuki Takayama, Kanagawa (JP);
Tatsuhiro Kawakami, Kanagawa (JP);
Hiroki Hatakeyama, Kanagawa (JP)

(73) Assignee: Kyocera Corporation, Fushimi-ku, Kyoto-shi, Kyoto (JP)

( * ) Notice: Subject to any disclaimer, the term of this patent is extended or adjusted under 35 U.S.C. 154(b) by 0 days.

(21) Appl. No.: 11/249,976

(22) Filed: Oct. 13, 2005

(65) Prior Publication Data

US 2006/0035686 A1    Feb. 16, 2006

Related U.S. Application Data

(63) Continuation of application No. 09/621,045, filed on Jul. 21, 2000, now abandoned.

(30) Foreign Application Priority Data

Jul. 23, 1999    (JP) .................. 11-209382

(51) Int. Cl.
*H04M 1/00*    (2006.01)
(52) U.S. Cl. ............... 455/566; 455/575.1; 455/90.3; 455/550.1; 345/520; 345/531; 345/533
(58) Field of Classification Search ............... 455/566, 455/570, 574, 575.1, 90.3, 550.1; 345/3.1, 345/2.3, 520, 531, 533; 713/323, 322
See application file for complete search history.

(56) References Cited

U.S. PATENT DOCUMENTS

| | | | |
|---|---|---|---|
| 4,486,624 A * | 12/1984 | Puhl et al. ............ 370/278 |
| 4,615,027 A * | 9/1986 | Rajkai et al. ............ 708/404 |
| 4,839,638 A | 6/1989 | Kosler et al. |
| 5,077,832 A * | 12/1991 | Szczutkowski et al. ...... 455/566 |
| 5,182,810 A * | 1/1993 | Bartling et al. ............ 713/323 |
| 5,404,547 A | 4/1995 | Diamantstein et al. |
| 5,471,663 A | 11/1995 | Davis |
| 5,604,928 A | 2/1997 | Hamano et al. |
| 5,630,224 A | 5/1997 | Swail |
| 5,664,162 A * | 9/1997 | Dye ............ 345/532 |
| 5,706,478 A * | 1/1998 | Dye ............ 345/503 |
| 5,929,868 A * | 7/1999 | Howard et al. ............ 345/545 |
| 5,946,469 A * | 8/1999 | Chidester ............ 703/24 |

(Continued)

FOREIGN PATENT DOCUMENTS

EP    0 310 325 A2    4/1989

(Continued)

OTHER PUBLICATIONS

Australian Office Action dated Apr. 8, 2003.

(Continued)

*Primary Examiner*—Sharad Rampuria
(74) *Attorney, Agent, or Firm*—Schulte Roth & Zabel LLP; John C. Garces

(57) ABSTRACT

A mobile telephone using the LCD for the display thereof wherein the address data bus connected to the CPU comprises two separate data buses; the one exclusively provided for the LCD, and the other one for the parts other than the LCD, and in the case of accesses other than access to the LCD, the LCD exclusive address data bus is not actuated.

18 Claims, 3 Drawing Sheets

U.S. PATENT DOCUMENTS

| | | | |
|---|---|---|---|
| 6,035,180 A * | 3/2000 | Kubes et al. | 455/575.1 |
| 6,115,823 A | 9/2000 | Velasco et al. | |
| 6,125,286 A * | 9/2000 | Jahagirdar et al. | 455/566 |
| 6,144,358 A | 11/2000 | Narayanaswamy et al. | |
| 6,202,109 B1 | 3/2001 | Salo et al. | |
| 6,327,482 B1 | 12/2001 | Miyashita | |
| 6,418,159 B1 | 7/2002 | Umemoto | |
| 6,466,202 B1 | 10/2002 | Suso et al. | |
| 6,466,216 B1 * | 10/2002 | Gotze et al. | 345/501 |
| 6,754,759 B1 | 6/2004 | Cook et al. | |
| 6,813,674 B1 * | 11/2004 | Velasco et al. | 710/311 |
| 7,034,792 B2 * | 4/2006 | Tamura | 345/98 |
| 7,281,066 B2 * | 10/2007 | Rader et al. | 710/51 |
| 7,292,235 B2 * | 11/2007 | Nose | 345/204 |
| 7,446,775 B2 * | 11/2008 | Hara et al. | 345/519 |
| 7,500,124 B2 * | 3/2009 | Seo | 713/322 |
| 7,508,981 B2 * | 3/2009 | Park | 382/166 |
| 2002/0190943 A1 | 12/2002 | Kayada et al. | |

FOREIGN PATENT DOCUMENTS

| | | |
|---|---|---|
| EP | 0 626 637 A1 | 11/1994 |
| JP | 0 214 1034 | 5/1990 |
| JP | 0 501 4540 | 1/1993 |
| JP | 05-014540 | 1/1993 |
| JP | 05014540 A * | 1/1993 |
| JP | 5158821 A | 6/1993 |
| JP | 10173608 A | 6/1998 |
| JP | 1 0257542 | 9/1998 |
| JP | 10-257542 | 9/1998 |

OTHER PUBLICATIONS

European Search Report dated Sep. 5, 2003.
Japanese Notification of Rejection dated Dec. 6, 2005.
Korean Office Action dated Sep. 18, 2006.

* cited by examiner

MOBILE TELEPHONE

CROSS-REFERENCE TO RELATED APPLICATIONS

This application is a continuation of U.S. patent application Ser. No. 09/621,045, filed Jul. 21, 2000 now abandoned. U.S. patent application Ser. No. 09/621,045 claims priority from Japanese Patent Application No. 11-209382, filed Jul. 23, 1999, the contents of which are hereby incorporated by reference herein in their entirety.

BACKGROUND OF THE INVENTION

The present invention relates to a mobile telephone using a liquid crystal display (LCD) for the display portion.

FIG. 3 is a block diagram showing the structure of an address data bus for a mobile telephone using a LCD in its display portion. In FIG. 3, when information specifying an address is output from the CPU 1 for performing processing such as internal computations and controls, same information is transmitted to all of a data writable/readable internal RAM 2, an internal ROM 3 in which executable programs are stored, a DAC (D/A converter) 4 for converting signals from digital to analogue, a timer 5 for timing and counting an elapsed time, a RF controller 6 for controlling radio, a LCD controller 15 for controlling a liquid crystal display, a non-volatile SRAM 8, and a FLASH/ROM 9. In other words, it is constructed in such a manner that by controlling any one of blocks connected to the CPU 1 via an address data bus 10 shown above, the same information is transmitted to all other blocks connected to the CPU 1 via the address data bus 10.

However, in the mobile telephone of recent years, the level of downsizing, weight reduction, and slimming down is ever increasing, and therefore, the structure is changing in such a manner that the LCD located on the upper part of the terminal is getting closer to the antenna. As shown in FIG. 4, in the case where the structure is such that the LCD 13 mounted to the mobile telephone 12 is locate in the vicinity of the antenna 14, thee is a recognized disadvantage in that the receiving sensitivity of the antenna 14 is deteriorated due to the noise generated from the address data bus connected to the LCD 13. It is because the distance between the antenna 14 and the LCD 13 is getting shorter with the advance of downsizing, and consequently the noise from the address data bus connected to the LCD 13 is apt to be transmitted to the antenna 14.

It is conceivable to reduce the noise from the address data bus by lowering the voltage on the bus line frequently, however, since the CPU 1 is also connected to a block of which the access timing is fast, it is impossible to lower the voltage of the bus line frequently.

SUMMARY OF THE INVENTION

In order to overcome the problem as is described above, according to the first aspect of the invention, a mobile telephone including display means for displaying information such as telephone numbers or character comprises: a first address data bus connected to the principal Ics (integrated circuits) such as control means and storage means; and a second address data bus connecting the control means and display means independently of the first address data bus; in that control means controls the first address data bus and the second address data bus independently.

According to the second aspect of the invention, in a mobile telephone as mentioned above, communication means for transmitting signals via radio line is provided and the control means controls to prohibit access to the second address data bus while the communication means is receiving signals.

DETAILED DESCRIPTION OF THE PREFERRED EMBODIMENTS

Figure 1:
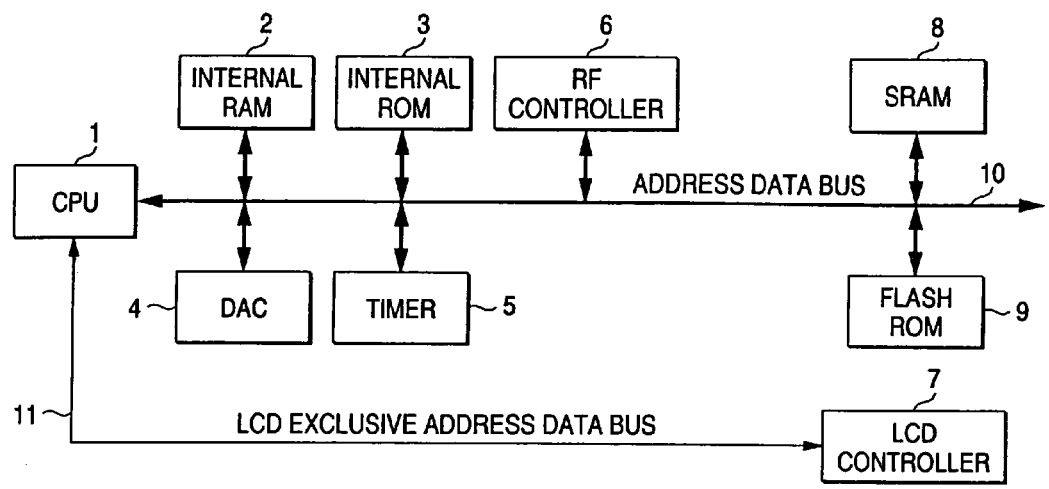
FIG. 1 is a block diagram showing the structure of the address data bus according to one embodiment of the invention.

Referring now to the drawings, the invention will be described according to an embodiment of the invention. The same reference numerals designate the identical parts throughout the drawings.

FIG. 1 is a block diagram showing the structure of the address data bus in a mobile telephone according to an embodiment of the invention. FIG. 1 shows a construction comprising block of; a CPU 1 for performing processing such as internal computations and controls, a data writable/readable internal RAM 2, and internal ROM 3 in which executable programs are stored, a DAC 4 for converting signals from digital to analogue (D/A converter), a timer 5 for timing and counting an elapsed time, a RF controller 6 for controlling radio, a LCD controller 7 for controlling the liquid crystal display, a non-volatile memory SRAM 8, and a FLASH_ROM 9. The address data bus for transmitting information specifying address comprises a LCD exclusive address data bus 11 connected to the CPU 1 for the LCD controller 7 only which is independently provided from other blocks, and an address data bus 10 for other block which are commonly connected to the CPU 1.

In this arrangement, the address data bus 11 for the LCD controller 7 can be actuated independently, and thus the noise generated from the LCD exclusive address data bus 11 can be reduced by lowering the voltage of the LCD exclusive address data bus 11 and degrading the driving ability.

Since the address data bus 11 for the LCD controller 7 is independent of the address data bus 10 commonly used for other blocks, even when the CPU 1 performs fast access to the memory, the antenna is not affected thereby.

In this way, by using the LCD exclusive address data bus 11 for the LCD controller 7 independently of other blocks, the LCD controller 7 can be held independently to minimize the noise from the address data bus 10 generated when blocks other than the LCD controller 7 are accessed.

Figure 2:
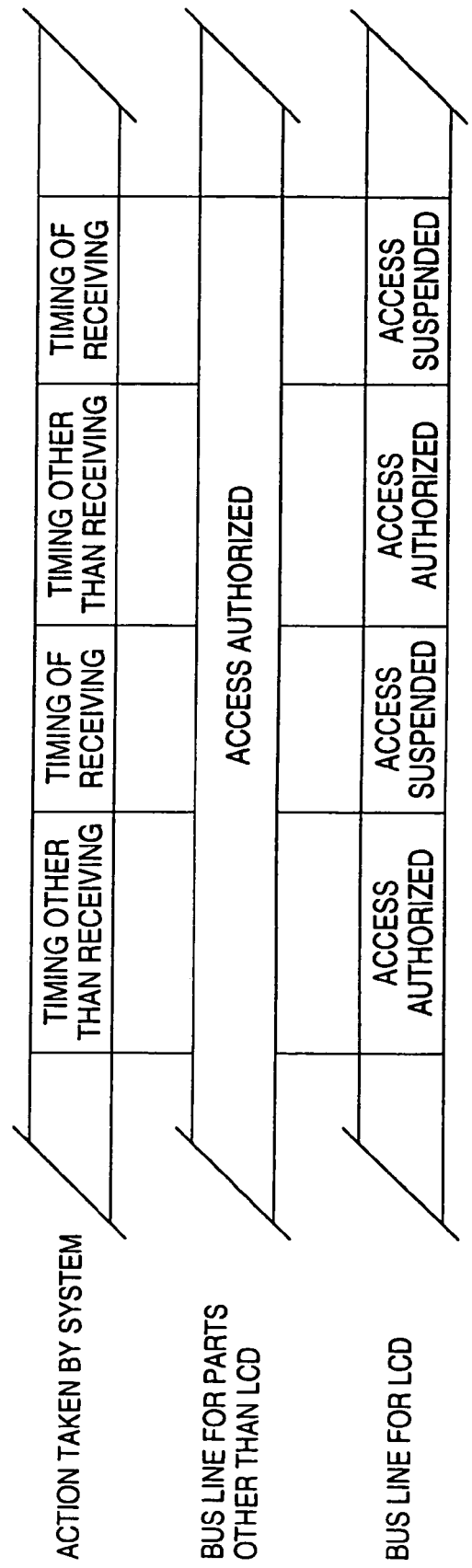
FIG. 2 is a timing chart for the control of the LCD exclusive address data bus according to one embodiment of the invention.
Figure 3:
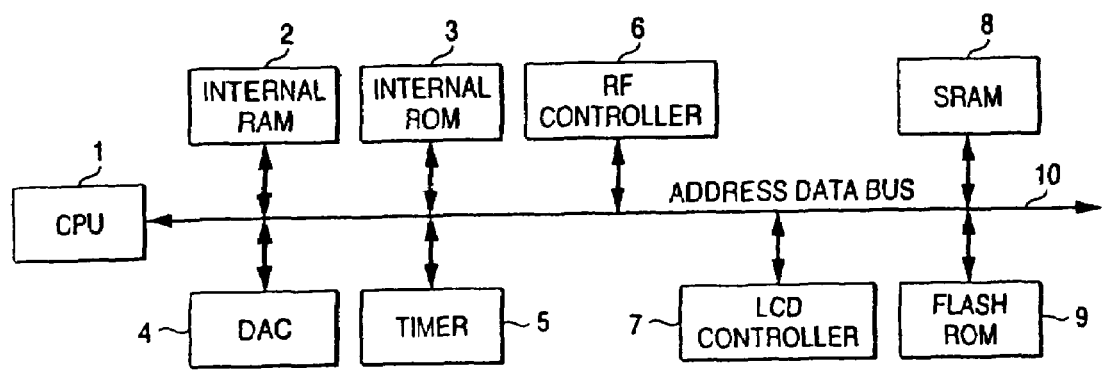
FIG. 3 is a block diagram showing the structure of the address data bus of the related art.
Figure 4:
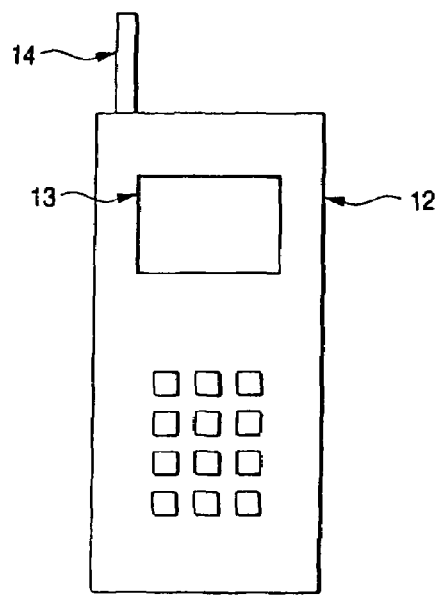
FIG. 4 is a drawing illustrating a positional relationship between the antenna and the LCD.

FIG. 2 is a timing chart showing an embodiment of the invention that controls the LCD exclusive address data bus in accordance with the transmission timing of radio signals.

It shows, from the top, transmission and receiving timings of radio signals, an access control of the address data bus commonly used by other blocks, and an access control timing of the LCD-exclusive address data bus. Since transmission of signals for controlling the LCD affects receiving of radio signals, access to the LCD is suspended during radio signals are being received.

According to the mobile telephone of the invention having a construction as stated above, deterioration of receiving sensitivity of the antenna while the LCD is not accessed may be reduced. In addition, even when the LCD is being accessed, controlling the independent LCD exclusive address data bus enables to maintain rapid access to the memory, to reduce the noise of the LCD exclusive address data bus line, and to alleviate the degradation of receiving sensitivity of the antenna, thereby improving the performance of radio.

The structure as stated above enables to receive radio signals of high quality irrelevantly to further downsizing, weight reduction and slimming down of the mobile telephone.

We claim:

1. A mobile telephone, comprising:
a display which displays information including telephone numbers or characters;
a first bus connected to a controller and a memory; and
a second bus connected to said controller and said display,
wherein said second bus is independent of said first bus,
wherein said first bus is not connected to said display and said second bus is not connected to said memory,
wherein said controller controls said first bus and said second bus independently, and
wherein said second bus is not connected to a radio unit.

2. The mobile telephone as claimed in claim 1, further comprising a receiver which receives signals via a radio line, wherein said controller prohibits access to said second bus while said receiver is receiving signals.

3. The mobile telephone as claimed in claim 1, wherein said display is arranged near an antenna of said mobile telephone.

4. A controller for a mobile telephone, comprising:
a first connector for a first bus which connects said controller and a memory; and
a second connector for a second bus which connects said controller and a display for displaying information including telephone numbers or characters,
wherein said second connector is independent of said first connector,
wherein said first bus is not connected to said display and second bus is not connected to said memory,
wherein said controller controls said first bus and said second bus independently, and
wherein said second bus is not connected to a radio unit.

5. The controller as claimed in claim 4, wherein said controller prohibit access to said second bus while a receiver of said mobile telephone including said controller is receiving signals via a radio line.

6. The controller as claimed in claim 4, wherein said second bus is driven by a lower voltage than said first bus.

7. A method for controlling a bus of a mobile telephone, the bus including a first bus connected to a controller and a memory and a second bus connected to said controller and a display, said first bus is not connected to said display, and said second bus is not connected to said memory, and said second bus is not connected to a radio unit, the method comprising:
displaying information including telephone numbers or characters on said display;
providing said second bus independently of said first bus; and
controlling said first bus and said second bus independently.

8. The method as claimed in claim 7, further comprising prohibiting access to said second bus while a receiver on said mobile telephone is receiving signals via a radio line.

9. A mobile telephone comprising:
a display which displays information including telephone numbers or characters;
a first bus connected to a controller and a memory; and
a second bus connected to said controller and said display;
wherein said second bus is provided independently of said first bus;
wherein said first bus is not connected to said display; and
wherein said second bus is not connected to a radio unit.

10. The mobile telephone as claimed in claim 9, wherein said controller controls said first bus and said second bus independently.

11. The mobile telephone as claimed in claim 9, further comprising a receiver which receives signals via a radio line, wherein said controller prohibits access to said bus while said receiver is receiving signals.

12. The mobile telephone as claimed in claim 9, wherein said display is arranged near an antenna of said mobile telephone.

13. A controller for a mobile telephone, comprising:
a first connector for a first bus which connects said controller and a memory; and
a second connector for a second bus which connects said controller and a display for displaying information, including telephone numbers or characters,
wherein said second connector is provided independently of said first connector,
wherein said first bus is not connected to said display and said second bus is not connected to said memory and
wherein said second bus is not connected to a radio unit.

14. The controller is claimed in claim 13, wherein said controller controls said first bus and said second bus independently.

15. The controller, as claimed in claim 13, wherein said controller prohibit access to said second bus while a receiver of said mobile telephone including said controller is receiving signals via a radio line.

16. A method for controlling a bus of a mobile telephone, the bus including a first bus connected to a controller and a memory and a second bus connected to said controller and a display, the method comprising:
displaying information including telephone numbers or characters on said display;
providing said second bus independently of said first bus;
wherein said first bus is not connected to said display, and said second bus is not connected to said memory and,
wherein said second bus is not connected to a radio unit.

17. The method as claimed in claim 16, further comprising controlling said first bus and said second bus independently.

18. The method as claimed in claim 16, further comprising prohibiting access to said second bus while a receiver on said mobile telephone is receiving signals via a radio line.

* * * * *